United States Patent Office 2,826,535
Patented Mar. 11, 1958

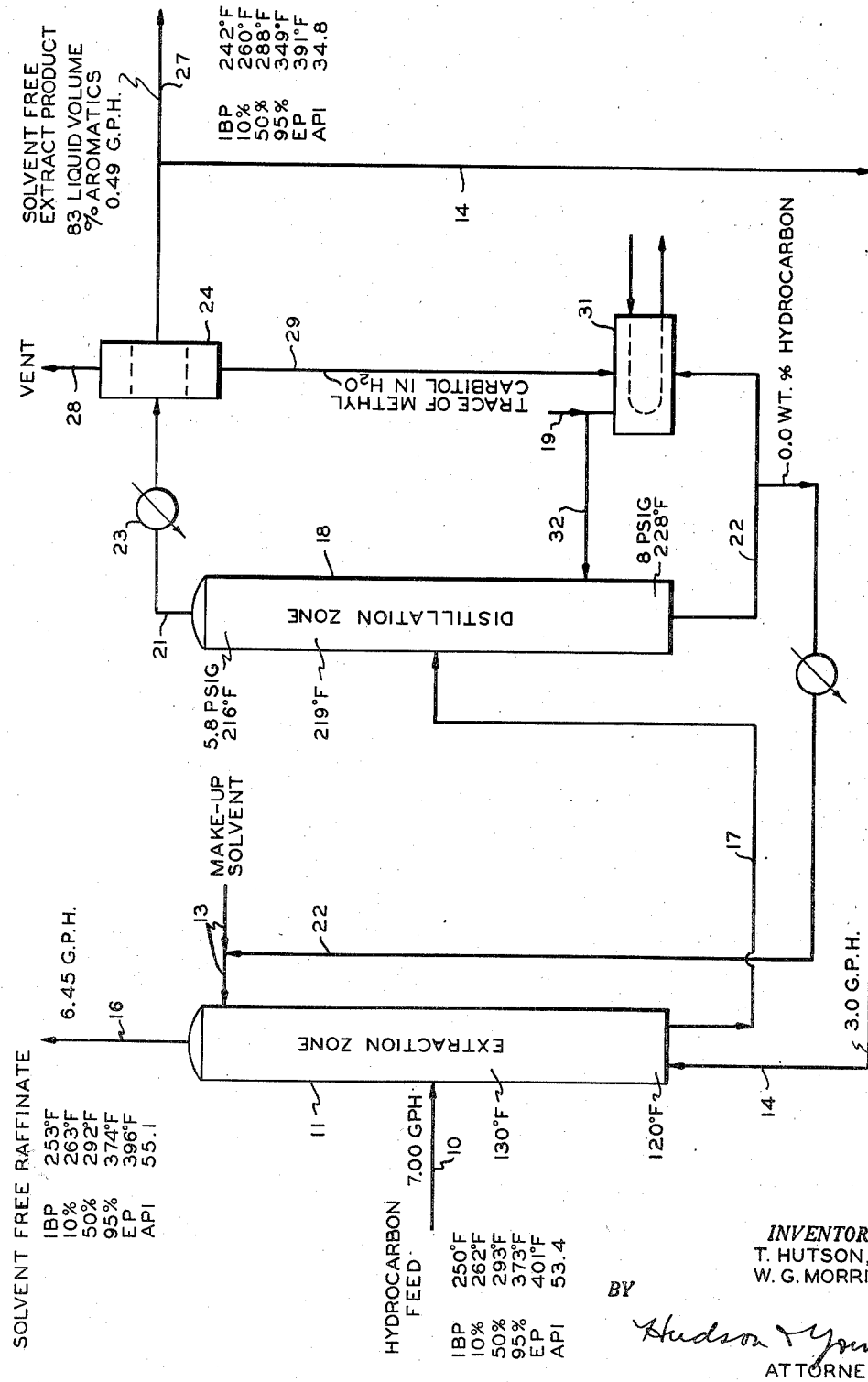

2,826,535

SOLVENT EXTRACTION AND RECOVERY OF PRODUCT AND SOLVENT THEREFROM

Thomas Hutson, Jr., and William G. Morrison, Phillips, Tex., assignors to Phillips Petroleum Company, a corporation of Delaware Application December 31, 1954, Serial No. 479,183

20 Claims. (Cl. 202—39.5)

This invention relates to solvent extraction. In one aspect this invention relates to the separation and recovery of hydrocarbon product and solvent from a phase from solvent extraction of hydrocarbons wherein a two-component solvent is employed, one component of which is hydrocarbon-immiscible and the other component of which is hydrocarbon-miscible. In another aspect this invention relates to a method for resolving such a solvent extraction phase as that above described, by distillation, wherein an adidtional proportion of a hydrocarbon-immiscible component, the same as that of the said solvent, is introduced into the distillation kettle in an amount sufficient to lower the distillation temperature of the hydrocarbons and to distill together with the said hydrocarbons from the distillation zone as overhead product while leaving as bottoms product, substantially hydrocarbon-free solvent suitable for reuse in the solvent extraction step. In another aspect this invention relates to a method for resolution of a solvent-containing hydrocarbon phase from selective solvent extraction of hydrocarbons employing methyl Carbitol plus water as the selective solvent, by distillation of the said phase while at the same time introducing water into the distillation zone in proportions sufficient to lower the distillation temperature of the hydrocarbons and distill the water and hydrocarbons from the distillation zone as overhead while leaving diethylene glycol monomethyl ether-water as substantially hydrocarbon-free kettle solvent product suitable for re-use in the solvent extraction. In still another aspect this invention relates to a method for controlling concentration of the said hydrocarbon-immiscible solvent component in a kettle product of distillation of the kind above described, by regulating the kettle temperature, during distillation, inversely with the desired predetermined concentration of the said hydrocarbon-immiscible component therein. In still another aspect this invention relates to such a process as described for regulation of concentration of the hydrocarbon-immiscible component in the distillation kettle, wherein said hydrocarbon-immiscible solvent component is water and the hydrocarbon-miscible solvent component is diethylene glycol monomethyl ether, referred to herein as methyl Carbitol. In still another aspect this invention relates to a method for the resolution of a solvent-containing phase as above described, wherein the hydrocarbon-immiscible solvent component, recovered as distillation overhead is recycled, at least in part, as the hydrocarbon immiscible material that is added to the distillation system. In still another aspect this invention relates to a distillation method as described wherein the hydrocarbon-miscible solvent component is diethylene glycol monomethyl ether and the hydrocarbon-immiscible component is water, and water recovered from the overhead product is recycled to the distillation kettle at least in part as the hydrocarbon-immiscible component added thereto.

In carrying out various solvent extraction processes in the prior art, it is often advantageous to employ as a selective solvent, a solvent comprising a plurality of ingredients such as solvent pairs. When the hydrocarbon and solvent of a solvent extraction phase each distill in markedly different ranges no problem of separation of solvent from product is ordinarily encountered. However, when the solvent and extraction product distill in ranges that overlap or which are each very close to the other, the problem of effecting separation of the solvent pair from product is encountered. This invention is concerned with a method for effecting resolution of such a hydrocarbon-plurality solvent.

In accordance with this invention, a solvent-containing phase resulting from selective solvent extraction of a hydrocarbon mixture employing a solvent consisting of a pair of ingredients, one of the said pair being miscible with the said hydrocarbons and the other of said pair being immiscible with said hydrocarbons and having a boiling point lower than that of the said miscible solvent component, is resolved by distillation into solvent and hydrocarbon phases by introducing additional immiscible component into the zone of the distillation in proportions sufficient to lower the hydrocarbon distillation temperature and to distill immiscible component together with hydrocarbons from the distillation zone as overhead while leaving as distillation bottoms product, solvent which is substantially hydrocarbon-free, and in one modification, having said ingredients in a concentration suitable for re-use in the extraction system.

Also, in accordance with this invention, an extract phase from diethylene glycol monomethyl ether-water solvent extraction of hydrocarbons is resolved by distillation into solvent and hydrocarbon phases by introducing additional proportions of water into the distillation zone which are sufficient to lower the distillation temperature of the hydrocarbons and to distill together with the hydrocarbons from the distillation zone as overhead while leaving bottoms product which is solvent, substantially hydrocarbon-free, in one modification, having said diethylene glycol monomethyl ether and water in a proportion suitable for re-use in said extraction.

Further, in accordance with this invention is provided in a process such as above described for the separation of hydrocarbons as overhead distillation product, the step of recycling at least a portion of the hydrocarbon-immiscible material recovered from the said overhead product, as the said hydrocarbon-immiscible material added to the distillation system, whereby to conserve for re-use any miscible solvent component contained therein.

Further, in accordance with this invention there is provided in a process as above described for the separation of hydrocarbons from solvent, the step of maintaining the desired concentration of hydrocarbon-immiscible solvent component in the distillation kettle by increasing the said kettle temperature sufficiently to lower the said hydrocarbon-immiscible component concentration to the desired level or by decreasing the said kettle temperature sufficiently to maintain a desired higher concentration of the said hydrocarbon-immiscible component.

This invention is particularly advantageously applied to a recovery and separation of hydrocarbons and solvent from an extract phase of solvent extraction of hydrocarbons employing a methyl Carbitol-water solvent pair as selective solvent.

In carrying out the process of this invention, the solvent extraction phase to be treated is subjected to ordinary distillation during which time additional proportions of the hydrcarbon-immiscible component of the solvent are added to the distillation kettle. The added hydrocarbon-immiscible material may be from any source, although as discussed hereinafter, it is preferably, at least in part, a recycle stream recovered from the overhead product. The said hydrocarbon-immiscible component is added in proportions sufficient to lower the distillation temperature of the hydrocarbons and to distill with the said hydrocarbons as overhead product while leaving as bottoms product, substantially hydrocarbon-free solvent. Thus, because the hydrocarbon and hydrocarbon-immiscible material are separate phases, the distillation temperature of the hydrocarbon is lowered so that although its normal boiling range may in some cases be higher than or overlap the distillation temperature of the higher boiling solvent component, it is, nevertheless, distilled from the system as overhead together with the lower boiling hydrocarbon-immiscible material without, however, taking overhead said higher boiling solvent component. Any trace quantities of hydrocarbon-miscible solvent component in the said overhead is recovered by said recycle. Due to the presence of hydrocarbon-immiscible solvent component in the kettle product and, further, to the relatively high volatility of the hydrocarbon-immiscible solvent component, substantially all of the higher boiling solvent component (hydrocarbon-miscible) is retained in the distillation kettle for recovery substantially hydrocarbon-free in form suitable for re-use in the solvent extraction step.

The operating pressures and temperatures employed during the distillation depend, of course, upon the specific solvent-hydrocarbon phase treated. The kettle temperature will be regulated to at least obtain the desired bottoms, i. e. substantially hydrocarbon-free solvent. Preferably said temperature will be regulated so as to obtain a solvent bottoms having its components in a proportion suitable for re-use in the extraction step. The proportions of hydrocarbon-immiscible solvent component material added to the distillation kettle are dependent upon the specific system. Distillation pressures are usually from about 10 to 40 p. s. i. a., and distillation temperatures are consonant therewith usually in the range from 100 to 500° F. Proportions of hydrocarbon-immiscible component introduced into the distillation zone, separate and apart from that initially present in the phase to be treated, are generally in a volume ratio to hydrocarbon material in the distillation system, within the range of about 0.05:1 to 10:1.

Proportions of hydrocarbon-immiscible component to hydrocarbon-miscible component in the stream to be distilled are dependent on the specific solvent employed; the solvent in this stream generally contains from about 2 to 25 weight percent hydrocarbon-immiscible component. The phase from solvent extraction, to be distilled, generally contains solvent in a liquid volume ratio to hydrocarbons of about 2:1 to 25:1 although values outside this range may be employed dependent upon the specific solvent and hydrocarbon mixture subject to the extraction.

The foregoing conditions of temperature, pressure and ratios are preferred and are advantageously employed when the phase to be treated is a solvent-containing phase from a diethylene glycol monomethyl ether-water extraction of hydrocarbons. However, in any event, when desired, conditions and ratios outside these ranges can be employed.

Illustrative of solvent pairs employed in the solvent extraction of hydrocarbons from which a resulting phase can be treated in accordance with our invention are diethylene glycol-water and diethylene glycol monomethyl ether-water.

Illustrative of various hydrocarbon fractions subjected to selective solvent extraction and from which a phase can be treated in accordance with our invention are low-boiling naphthene concentrates, straight run gasoline, kerosene, gas oil, diesel fuel, and in general any hydrocarbon fraction containing components of varying degrees of solubility in the selective solvent employed. Thus, hydrocarbon fractions containing a high concentration of cyclopentane or of cyclohexane, such as an 85 weight percent cyclohexane fraction, naphthenic fractions such as $C_8$'s, having a boiling range of about 211–264° F., or $C_9$'s, having a boiling range of 269–302° F., or $C_{10}$'s, having a boiling range of 302–348° F., and mixed aromatic fractions such as one having a boiling range of 176–450° F., are representative of hydrocarbon fractions which can be subjected to solvent extraction from which a phase is treated in accordance with this invention.

The low-boiling solvent component, i. e., the hydrocarbon-immiscible solvent component which has a boiling point lower than that of the hydrocarbon-miscible solvent component, although immiscible with hydrocarbons in the phase treated, is miscible with the other component, i. e., with the hydrocarbon-miscible solvent component in an amount at least sufficient to give the desired solvent mixture during the extraction step, i. e., at the extraction temperature.

Our invention is illustrated with reference to the attached drawing wherein, for illustrative purposes, it being understood that this invention is not limited thereto, is set forth one embodiment wherein a straight run gasoline, having a boiling range of 250–401° F. is subjected to solvent extraction employing aqueous diethylene glycol monomethyl ether, and wherein water is added to the extract distillation zone to effect solvent-hydrocarbon separation in accordance with this invention. Also illustrated with reference to the drawing are features of this invention, namely, recycling to conserve any hydrocarbon-miscible solvent component removed from the system in the overhead distillation product, and regulating kettle temperature to maintain the desired concentration of hydrocarbon-immiscible component therein, whereby to produce as substantially hydrocarbon-free kettle product a solvent suitable for re-use in the extraction zone. The invention is further illustrated by reference on the drawing to certain process temperatures and stream volumes (gallons per hour) employed in the specific embodiment discussed and to distillation characteristics of hydrocarbon feed, raffinate hydrocarbon product and extract hydrocarbon product of that embodiment.

Hydrocarbon feed (straight run gasoline 250–401° F.) is charged via line 10 to solvent extraction zone 11 at a central point, preferably about mid-point, at a rate and at a temperature such as about 100 to 150° F. so as to maintain the system, together with added solvent described hereinafter, at a solvent extraction temperature within the range of about 100 to 150° F. A solvent pair, namely, diethylene glycol monomethyl ether-water is introduced via line 13 into an upper portion of zone 11 at a temperature generally of about 90 to 160° F., in any event so as to maintain the above-referred-to solvent extraction temperature in zone 11. The liquid volume ratio of solvent (diethylene glycol monomethyl ether plus water) to hydrocarbon in zone 11 although generally within the range described hereinabove is preferably about 12:1 to 16:1. The liquid volume ratio of water to diethylene glycol monomethyl ether in the solvent introduced from line 13 is generally within the range described hereinabove, although preferably about 0.15:1 to 0.25:1. Reflux is introduced into a lower portion of zone 11 via line 14 as described hereinafter. Raffinate phase, predominantly paraffinic hydrocarbons containing solvent in a volume ratio to hydrocarbons in the range of about 0.001:1 to 0.05:1 is withdrawn via line 16. Raffinate phase product is then subjected to product purification, not shown, for recovery of raffinate hydrocarbon product. Raffinate product is further characterized by the distillation data set forth on the drawing.

Extract phase, comprising diethylene glycol monomethyl ether-water-hydrocarbons (substantially aromatics) is withdrawn from zone 11 via line 17 and passed to extract distillation, or fractionation, zone 18 wherein water-Carbitol is separated as kettle product notwithstanding that a substantial portion of the extract hydrocarbons normally boil in a range higher than the boiling point of the methyl Carbitol-water solvent; the boiling range of the aromatic extract hydrocarbons, in this embodiment, being within the limits of about 242 to 391° F.

Seperation in zone 18 is accomplished by introducing water, or steam, via line 19 into zone 18, i. e., in addition to that water charged in the extract phase via line 17, in an amount sufficient to lower the distillation temperature of hydrocarbons in zone 18 and to distill with the said hydrocarbons from zone 18 as overhead product, thereby leaving as bottoms product in zone 18 substantially hydrocarbon-free solvent. Such an amount of water added to zone 18 is advantageously expressed in terms of liquid volume ratio of the added water to extract hydrocarbons in zone 18, as set forth hereinabove, which is preferably within the range of about 0.1:1 to 10:1. Any water present in the kettle of zone 18 in an amount in excess of that required for distillation with hydrocarbon, as overhead, and for withdrawal as solvent component, in this embodiment, is distilled from the system with the said overhead via line 21.

Operating conditions such as temperature and pressure as well as various stream volumes are indicated in the drawing. As stated hereinabove, specific conditions employed are dependent upon the specific extract phase treated. However, in this embodiment, the distillation in zone 18 is advantageously conducted at a top column pressure of about 0 to 15 p. s. i. g. and at temperatures constant therewith such as a kettle temperature of about 210 to 230° F., and a temperature of the overhead of about 210 to 220° F.

Operating in accordance with this invention as illustrated, due to the immiscibility of water and hydrocarbon phases in zone 18 (two separate phases) the distillation temperature of the hydrocarbon is lowered causing it thereby to be distilled with water from zone 18 at a temperature lower than the distillation temperature of diethylene glycol monomethyl ether therein. The amount of water added to zone 18 by way of line 19 is preferably slightly in excess of the water necessary to co-distill with all hydrocarbons in zone 18. Thus, water in about the same amount as added via extract phase in line 17, remains in the kettle product, and resulting kettle product comprising methyl Carbitol-water substantially hydrocarbon-free is withdrawn via line 22 preferably for recycle to extraction zone 11.

Thus, in accordance with this invention, a sufficient proportion of water is added to the system via line 19 to provide for separate hydrocarbon and water phases at all times for distillation in zone 18.

It is another features of this invention that the amount of hydrocarbon-immiscible solvent component, water in this embodiment, added via line 19 need not be calculated with precision or adhered to in order to maintain the water content of a solvent (kettle product, zone 18) at the desired level. We have found that the hydrocarbon-immiscible solvent component content in the said kettle can be maintained at the desired level by raising or lowering the distillation kettle temperature. Thus, in this embodiment by raising the said kettle temperature, the water concentration in the kettle is lowered, and by lowering the said temperature the said water concentration is increased, i. e., the concentration is varied inversely with the level of the regulated kettle temperature. In this manner, solvent of required water-Carbitol composition is provided for at all times.

Hydrocarbon phase-water phase in line 21 is passed via cooler 23 to settler 24 wherein water phase often containing traces of methyl Carbitol is separated as a bottom layer, and hydrocarbon extract product is separated as a top layer. Hydrocarbon phase is withdrawn from zone 24 via line 14 and passed in part as reflux to extraction zone 11 and is withdrawn in remaining part via line 27 as extract product of the process. It is another feature of our invention that water phase from zone 18 (bottom layer, zone 24) can be recycled to the distillation zone 18 together with, and preferably in lieu of water, from any source, added from line 19, thereby providing for conservation of diethylene glycol monomethyl ether that has distilled from zone 18 with hydrocarbons and water. Water phase from zone 24 is accordingly passed via line 29, reboiler 31 and line 32 to zone 18.

Although we have illustrated this invention with reference to a specific solvent extraction system, it is to be understood that consonant with the disclosure herein other solvents and solvent extraction processes can be employed, from which a phase can be recovered for treatment to separate solvent from hydrocarbons therein, in accordance with our invention.

Reasonable variation and modification are possible within the scope of the foregoing disclosure, drawing and appended claims to the invention, the essence of which is that a phase from a hydrocarbon solvent extraction employing a solvent pair consisting of a hydrocarbon-immiscible component and a hydrocarbon-miscible component (such as diethylene glycol monomethyl ether-water), the hydrocarbon-miscible component having a boiling point above the former, is distilled to produce hydrocarbons as overhead, and a substantially hydrocarbon-free solvent pair as kettle product, in one modification said solvent pair, as obtained as kettle product, having said pair in proportions rendering it suitable for re-use in said extraction, by introducing into the distillation zone during the distillation, a hydrocarbon-immiscible material, the same as that of the said hydrocarbon-immiscible solvent component, in proportions sufficient to lower the distillation temperature of the hydrocarbons to distill substantially all of said hydrocarbons as overhead from the distillation zone, while leaving as bottoms product, substantially hydrocarbon-free solvent, in one modification recovering said solvent pair in proportions suitable for re-use in said extraction by regulating kettle temperature to obtain, as kettle product, the solvent pair containing components in said proportions suitable for re-use in the solvent extraction step; and another feature being the step of recycling hydrocarbon-immiscible material from the overhead distillation product to the distillation zone as the said added hydrocarbon-immiscible material whereby to conserve any hydrocarbon-miscible solvent component, in the overhead, for re-use in the solvent extraction step.

We claim:

1. In the separation by distillation of components of a phase resulting from selective solvent extraction of hydrocarbons, wherein said selective solvent consists of a pair of ingredients, one of said pair being miscible with said hydrocarbons contacted therewith and the other of said pair being immiscible with said hydrocarbons and having a boiling point lower than that of said miscible solvent, the improvement comprising introducing additional immiscible component into the zone of said distillation in an amount sufficient to distill said immiscible component and said hydrocarbons from said zone as overhead, while adjusting the temperature of the distillation zone bottoms to recover therefrom a substantially hydrocarbon-free solvent pair containing its components in a proportion suitable for re-use in said selective solvent extraction, said proportion being substantially the same as the proportion present in said selective solvent consisting of said pair of ingredients.

2. In the separation by distillation of components of a phase resulting from selective solvent extraction of hydrocarbons, wherein said selective solvent consists of a pair of ingredients, one of said pair being miscible with said hydrocarbons contacted therewith and the other of said pair being immiscible with said hydrocarbons and having a boiling point lower than that of said miscible solvent, the improvement comprising introducing additional immiscible component into the zone of said distillation in an amount sufficient to distill said immiscible component and said hydrocarbons from said zone as overhead substantially free of said hydrocarbon-miscible component, while leaving and recovering as bottoms substantially hydrocarbon-free solvent having substantially the same composition of said selective solvent consisting of said pair of ingredients.

3. In the separation by distillation of components of a phase resulting from selective solvent extraction of hydrocarbons, wherein said solvent is a mixture of diethylene glycol monomethyl ether and water, the improvement comprising introducing additional proportions of water into the zone of said distillation in an amount sufficient to distill said water and said hydrocarbons from said zone as overhead substantially free of said diethylene glycol monomethyl ether while leaving and recovering as bottoms substantially hydrocarbon-free solvent having a ratio of diethylene glycol monomethyl ether to water substantially the same as present in said mixture.

4. The method of claim 3 wherein the water content of said bottoms solvent is, on a weight basis, from 2–25 percent.

5. The method of claim 2 wherein the concentration of hydrocarbon-immiscible liquid in the kettle of said distillation is maintained at a predetermined level by changing the temperature in said kettle in response to a change in the said predetermined concentration.

6. The method of claim 3 wherein the concentration of water in the kettle of said distillation is maintained at a predetermined level by changing the temperature in said kettle in response to a change in the desired predetermined concentration.

7. The method of claim 2 wherein hydrocarbon-immiscible solvent component distilled from the zone of said distillation is recycle as at least a portion of the said hydrocarbon-immiscible liquid added to the said zone, whereby any hydrocarbon-miscible solvent component therein is re-used in said distillation.

8. The method of claim 3 wherein water distilled from said distillation zone is recycled as at least a portion of said water added to said zone, whereby any diethylene glycol monomethyl ether in said overhead is re-used in said distillation.

9. The method of claim 3 wherein said hydrocarbon subjected to solvent extraction is a straight-run gasoline.

10. The method of claim 3 wherein said hydrocarbon subjected to said solvent extraction is a naphthenic fraction containing predominantly $C_8$ hydrocarbons.

11. The method of claim 3 wherein said hydrocarbon subjected to said solvent extraction is a naphthenic fraction containing predominantly $C_9$ hydrocarbons.

12. The method of claim 3 wherein said hydrocarbon subjected to said extraction is a naphthenic fraction containing predominantly $C_{10}$ hydrocarbons.

13. The method of claim 3 wherein said hydrocarbon subjected to solvent extraction is a mixed aromatic fraction.

14. The method of claim 2 wherein the proportion of hydrocarbon-immiscible liquid introduced into said distillation zone is in a liquid volume ratio to hydrocarbon therein within the range of 0.1:1 to 10:1.

15. The method of claim 14 where total solvent to hydrocarbon in the said phase from solvent extraction is within the range, on a liquid volume basis, of from 12:1 to 16:1.

16. The method of claim 3 wherein solvent employed in said solvent extraction contains from 2 to 25 liquid volume percent water.

17. The method of claim 3 wherein water is introduced into the zone of said distillation in a liquid volume ratio to total hydrocarbon in said zone within the range of 0.1:1 to 10:1.

18. The method of claim 3 wherein the volume ratio of hydrocarbon to solvent in said phase to be distilled, is within the range of 0.2:1 to 0.04:1.

19. In the separation by distillation of components of a phase resulting from selective solvent extraction of hydrocarbons, wherein said selective solvent consists of a pair of ingredients, one of said pair being miscible with said hydrocarbons contacted therewith and the other of said pair being immiscible with said hydrocarbons and having a boiling point lower than that of said miscible solvent, the improvement comprising introducing additional immiscible component into the zone of said distillation in an amount sufficient to distill said immiscible component and said hydrocarbons from said zone as overhead, while adjusting the temperature of the distillation zone bottoms to recover therefrom a substantially hydrocarbon-free solvent pair containing its components in a proportion suitable for re-use in said selective solvent extraction, said proportion being substantially the same as the proportion present in said selective solvent consisting of said pair of ingredients, at least part of said additional immiscible component introduced into said distillation zone being recycled from distillate obtained from said distillation.

20. In the separation by distillation of components of a phase resulting from selective solvent extraction of hydrocarbons, wherein said solvent is a mixture of diethylene glycol monomethyl ether and water, the water content of said solvent being in the range from 2 to 25 percent, the improvement comprising introducing additional proportions of water into the zone of distillation in an amount sufficient to distill water and said hydrocarbons from said zone as overhead substantially free of said diethylene glycol monomethyl ether while leaving and recovering as bottoms substantially hydrocarbon-free solvent having a ratio of diethylene glycol monomethyl ether to water substantially the same as present in said mixture, controlling the temperature of said distillation to maintain the concentration of water in said solvent mixture at a predetermined value within the range from 2 to 25 percent which predetermined solvent composition is that desired for use in further solvent extraction of hydrocarbons, at least a part of the said additional proportions of water being recycled from said overhead.

References Cited in the file of this patent

UNITED STATES PATENTS

| | | |
|---|---|---|
| 1,919,752 | Schmidt | July 25, 1933 |
| 2,273,923 | Bludworth | Feb. 24, 1942 |
| 2,380,019 | Bloomer | July 10, 1945 |
| 2,387,992 | Hachmuth | Oct. 20, 1945 |
| 2,415,192 | Rittenhouse | Feb. 4, 1947 |
| 2,467,198 | Greene | Apr. 12, 1949 |
| 2,559,519 | Smith | July 3, 1951 |
| 2,695,322 | Weedman | Nov. 23, 1954 |
| 2,711,433 | Poffenberger | June 21, 1955 |
| 2,726,275 | Lien et al. | Dec. 6, 1955 |
| 2,737,538 | Nelson | Mar. 6, 1956 |

OTHER REFERENCES

Rossini et al.: "Hydrocarbons from Petroleum," American Chemical Society Monograph Series (1953), p. 454. (Copy in classification Division I.)

"Azeotropic Data," by Horsley, Advances in Chem., Series #6 (A. C. S.) (1952). (Copy in Division 25.)